United States Patent
Inada

(10) Patent No.: US 8,599,807 B2
(45) Date of Patent: Dec. 3, 2013

(54) WIRELESS COMMUNICATION DEVICE, WIRELESS COMMUNICATION SYSTEM, AND METHOD FOR SELECTING WIRELESS COMMUNICATION ROUTE

(75) Inventor: Tetsuya Inada, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 167 days.

(21) Appl. No.: 13/181,519

(22) Filed: Jul. 13, 2011

(65) Prior Publication Data

US 2012/0014362 A1 Jan. 19, 2012

(30) Foreign Application Priority Data

Jul. 15, 2010 (JP) ................. 2010-160504

(51) Int. Cl.
*H04W 4/00* (2009.01)
(52) U.S. Cl.
USPC .......................................................... 370/338
(58) Field of Classification Search
USPC .................................................. 370/328–339
See application file for complete search history.

(56) References Cited

U.S. PATENT DOCUMENTS

| | | | |
|---|---|---|---|
| 6,580,700 B1 * | 6/2003 | Pinard et al. ............... | 370/332 |
| 6,940,843 B2 * | 9/2005 | Goodall et al. ............ | 370/338 |
| 2011/0128881 A1 * | 6/2011 | Zhai ........................... | 370/252 |

FOREIGN PATENT DOCUMENTS

| | | |
|---|---|---|
| JP | 2001-095048 A | 4/2001 |
| JP | 2007-174368 A | 7/2007 |
| JP | 2008-118484 A | 5/2008 |
| JP | 2009-218913 A | 9/2009 |
| JP | 2009-302694 A | 12/2009 |
| JP | 2010-520676 A | 6/2010 |
| WO | WO-2010-013150 A2 | 2/2010 |

OTHER PUBLICATIONS

Jang et al, Traffic-Aware Decentralized AP Selection for Multi-Rate in WLANs, ICACT 2010, 6 pages, Feb. 2010.*

* cited by examiner

*Primary Examiner* — Frank Duong
(74) *Attorney, Agent, or Firm* — Oblon, Spivak, McClelland, Maier & Neustadt, L.L.P.

(57) ABSTRACT

An effective velocity estimation section 322 of a wireless LAN device WLD3 connected to a wireless terminal WT estimates effective velocities V on a plurality of wireless communication routes to a wireless LAN device WLD1 connected to an external network. A selection section 330 of the wireless LAN device WLD3 selects another wireless LAN device that realizes the maximum-speed effective velocity V of communication with the wireless LAN device connected to the external network, from among a plurality of other wireless LAN devices. A communication control section 310 of the wireless LAN device WLD3 performs connection processing for the selected wireless LAN device.

16 Claims, 11 Drawing Sheets

F I G. 8
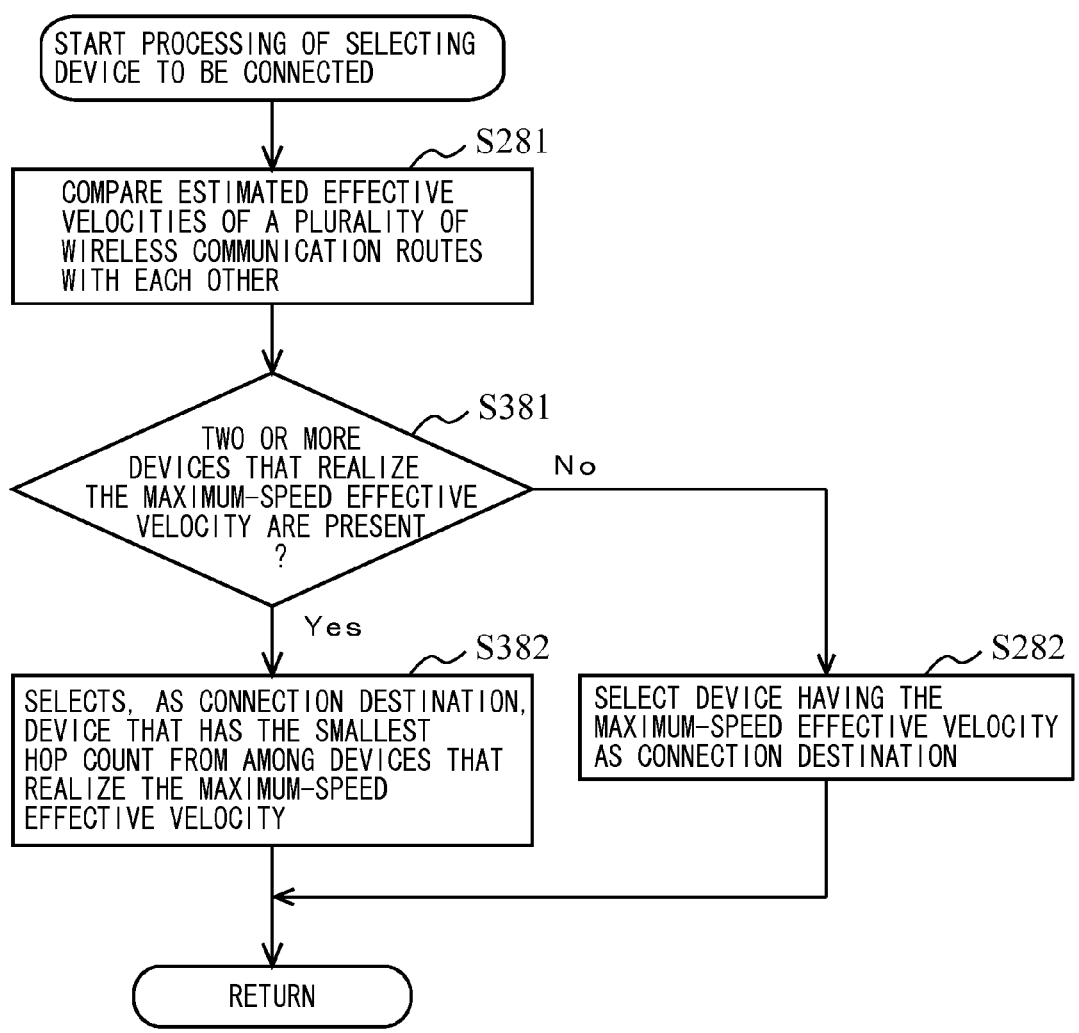

F I G. 9
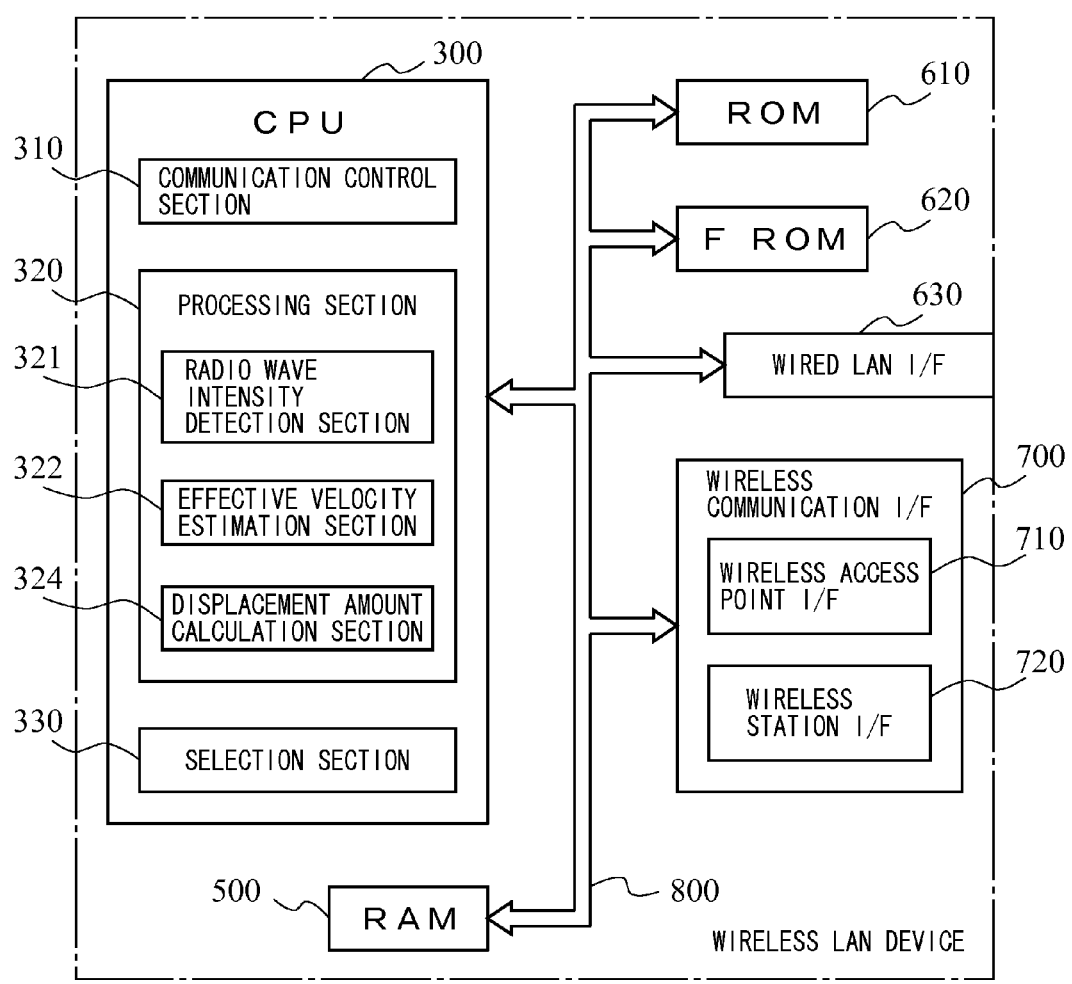

WIRELESS COMMUNICATION DEVICE, WIRELESS COMMUNICATION SYSTEM, AND METHOD FOR SELECTING WIRELESS COMMUNICATION ROUTE

CROSS REFERENCE TO RELATED APPLICATION

The disclosure of Japanese Patent Application No. 2010-160504, filed on Jul. 15, 2010, is incorporated herein by reference.

BACKGROUND OF THE INVENTION

1. Field of the Invention

The present invention relates to a wireless communication device, a wireless communication system including a plurality of wireless communication devices, and a method for selecting a wireless communication route executed by the wireless communication system.

2. Description of the Background Art

Conventionally, there is known a technique in which a wireless communication system including a plurality of wireless communication devices such as wireless LAN (local area network) devices and wireless terminals, in the case where there are a plurality of wireless communication routes that connect a wireless terminal and a wireless LAN device that is connected to an external network, autonomously sets a wireless communication route that satisfies a predetermined condition (see, for example, Japanese Laid-Open Patent Publication No. 2009-218913, Japanese Laid-Open Patent Publication No. 2007-174368, and Japanese Laid-Open Patent Publication No. 2008-118484).

However, in some cases, conventional techniques as described above are not always able to autonomously set an optimum wireless communication route. The following shows examples of such cases.

In one of the conventional techniques, when there are a plurality of prospective wireless communication routes, each of wireless LAN devices selects, as a connection destination, one of wireless LAN devices present in the vicinity of the wireless LAN device in accordance with the intensity of a radio wave received from the wireless LAN devices, whereby a wireless communication route from a wireless terminal to a wireless LAN device connected to an external network is determined. However, in this technique, since effective velocities among the wireless LAN devices are not taken into consideration, the effective velocity of a wireless communication route structured by connecting wireless LAN devices from which radio waves having large intensities are received is not always the maximum-speed.

In addition, in another one of the conventional techniques, when there are a plurality of prospective wireless communication routes, each of wireless LAN devices selects, as a connection destination, one of wireless LAN devices present in the vicinity of the wireless LAN device in accordance with hop counts about the wireless LAN devices, whereby a wireless communication route from a wireless terminal to a wireless LAN device connected to an external network is determined. However, also in this technique, since effective velocities among the wireless LAN devices are not taken into consideration, the effective velocity of a wireless communication route structured by connecting wireless LAN devices such that the hop count becomes small is not always the maximum-speed.

SUMMARY OF THE INVENTION

Therefore, an object of the present invention is to provide a wireless communication device, a wireless communication system including a plurality of wireless communication devices, and a method of selecting a wireless communication route executed by the wireless communication system, that are capable of autonomously setting an optimum wireless communication route in the wireless communication system including the plurality of wireless communication devices when there are a plurality of wireless communication routes that can be structured, to a wireless communication device connected to an external network.

The present invention is directed to a wireless communication system which includes: a given wireless communication device connected to an external network; and two or more of the wireless communication devices directly or indirectly connectable to the given wireless communication device and to a wireless communication device included in the wireless communication system. In order to achieve the above object, a wireless communication device according to the present invention comprises: a processing section for estimating effective velocities of communication on a plurality of wireless communication routes structurable between said wireless communication device and the designated wireless communication device; and a selection section for selecting as a connection destination one of the designated wireless communication device and the wireless communication devices other than said wireless communication device such that, among the plurality of wireless communication routes, a maximum-speed wireless communication route, being a wireless communication route having the maximum-speed effective velocity estimated by the processing section, is structured. The processing section detects radio-wave intensity of signals received from the designated wireless communication device or other wireless communication devices, and based on the radio-wave intensity estimates the effective velocities of the plurality of wireless communication routes.

When a plurality of maximum-speed wireless communication routes are present, the processing section may calculate a hop count indicating the number of other wireless communication devices intervening, between said wireless communication device and the designated wireless communication device, on each of the plurality of wireless communication routes, and the selection section may select as a connection destination one of the designated wireless communication device and the wireless communication devices other than said wireless communication device such that the maximum-speed wireless communication route having the smallest hop count is structured. Alternatively, the processing section may calculate the amount of temporal variation in the effective velocity of communication on each of the plurality of wireless communication routes, and the selection section may select as a connection destination one of the designated wireless communication device and the wireless communication devices other than said wireless communication device such that the maximum-speed wireless communication route in which the amount of temporal variation in effective velocity is smallest is structured.

The wireless communication device may further comprise a communication control section for transmitting indicator information relating to the effective velocity of the maximum-speed wireless communication route, being that which the designated wireless communication device or the other wireless communication device, having been selected by the selection section, structures, and for receiving such indicator information transmitted from another wireless communication device. In addition, the processing section may use the effective velocity included in such indicator information that the communication control section has received, to estimate the effective velocity of a wireless communication route, to the designated wireless communication device, passing the other wireless communication device having transmitted the indicator information. In this case, the indicator information may include the hop count or the amount of temporal variation in the effective velocity, and the selection section, when a plurality of maximum-speed wireless communication routes are present, may select as a connection destination one of the designated wireless communication device and the wireless communication devices other than said wireless communication device such that one of the plurality of maximum-speed wireless communication routes is structured, based on the hop count or the amount of temporal variation in the effective velocity calculated by the processing section, and the hop count or the amount of temporal variation in the effective velocity included in such indicator information the communication control section has received.

Processing performed in the above wireless communication system may be understood as a method for selecting a wireless communication route to be structured between the designated wireless communication device and one of the two or more wireless communication devices. The method for selecting a wireless communication route comprises: a step of estimating effective velocities of communication on a plurality of wireless communication routes structurable between the designated wireless communication device and the one of the two or more wireless communication devices; and a step of selecting as a connection destination one of the designated wireless communication device and the wireless communication devices other than said wireless communication device such that, among the plurality of wireless communication routes, a maximum-speed wireless communication route, being a wireless communication route having the maximum-speed effective velocity estimated by the processing section, is structured.

In addition, the method for selecting a wireless communication route may be realized by a program for executing the above steps. The program may be stored in a computer-readable non-transitory storage medium.

The present invention is applicable to a communication device for performing communication such as wireless communication in a communication network, for example. The above and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flowchart showing a detailed flow of processing of step S380 in FIG. 7.

FIG. 9 is a diagram showing the internal configuration of a wireless LAN device according to the third embodiment of the present invention.

DESCRIPTION OF THE PREFERRED EMBODIMENTS

Figure 1:
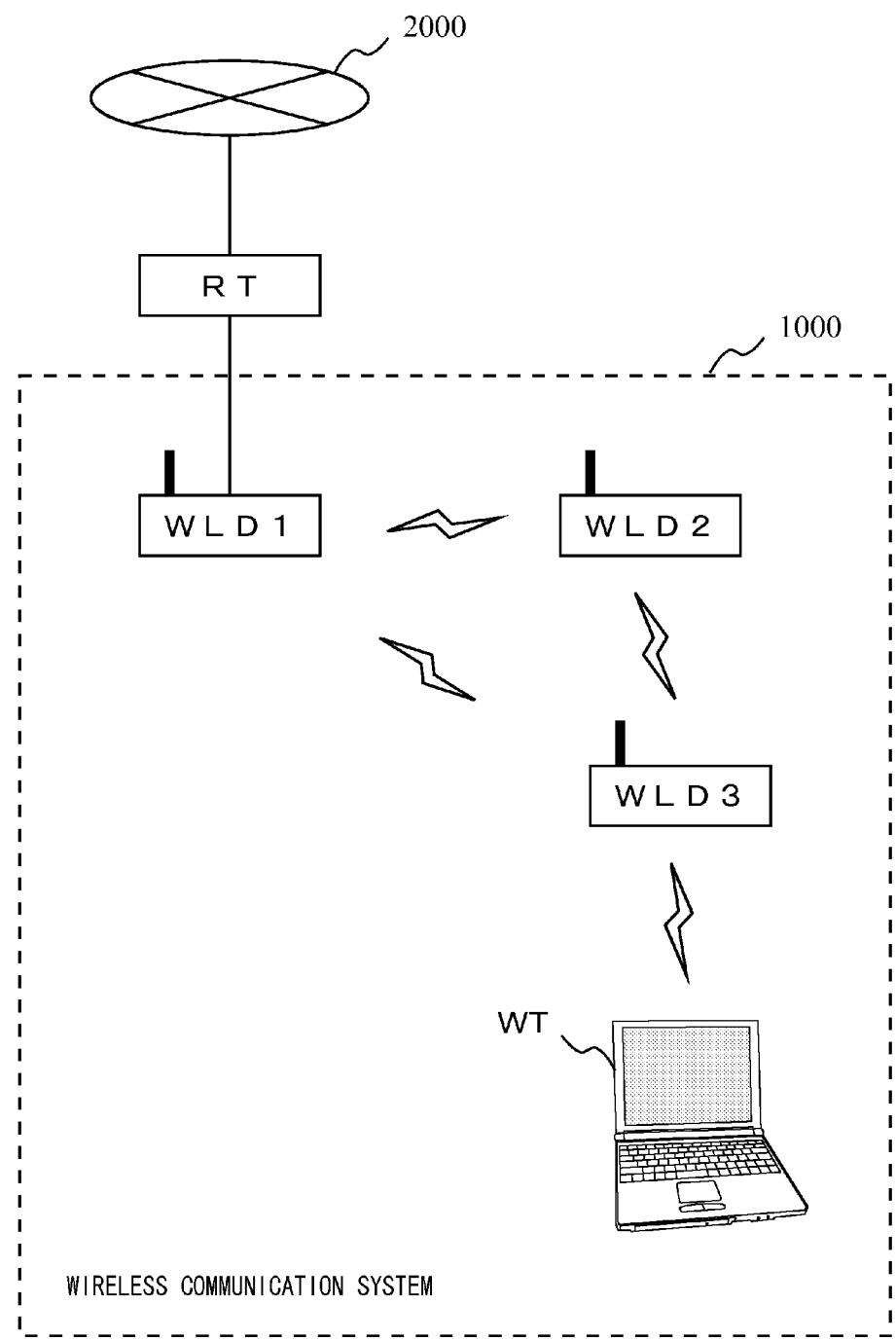
FIG. 1 is a schematic diagram showing an example of the configuration of a wireless communication system according an embodiment of the present invention.

FIG. 1 is a diagram exemplarily illustrating a simplified configuration of a wireless communication system 1000 according to one embodiment of the present invention. As represented in FIG. 1, the wireless communication system 1000 is furnished with a wireless terminal WT, and wireless LAN devices WLD1 to WLD3. The wireless terminal WT and the wireless LAN devices WLD1 to WLD3 in the present embodiment are compliant with the Institute of Electrical and Electronics Engineers (IEEE) 802.11 standard. The wireless terminal WT and the wireless LAN devices WLD1 to WLD3 have been made to have identical extended service set identifiers (ESSIDs) and wireless encryption settings. In addition, the wireless LAN devices WLD1 to WLD3 are furnished with the same internal configurations, as will be described later, and each has bridge functionality connecting wired LANs with wireless LANs, and wireless distribution system (WDS) functionality relaying packets among wireless LAN devices.

The wireless LAN device WLD1 is connected via a wire-connected router RT to an external network 2000 such as the Internet or a WAN (wide area network). In the present embodiment, the router RT has gateway functionality and dynamic host configuration protocol (DHCP) functionality. It is to be noted that the wireless LAN device WLD1 may be provided with the router RT functionality.

The wireless LAN devices WLD1 to WLD3 are positioned within radio-wave-arriving range of each other so as to enable them to communicate with each other. In the present embodiment, the distance between the wireless LAN device WLD1 and the wireless LAN device WLD3 is longer than the distance between the wireless LAN device WLD2 and the wireless LAN device WLD3. The details of the wireless LAN devices WLD1 to WLD3 will be described later.

The wireless terminal WT is, for example, a general-purpose personal computer having wireless-communication functionality. The wireless terminal WT can communicate with other wireless terminals, which are not shown, via the wireless LAN devices WLD1 to WLD3, and can access the external network 2000. In the present embodiment, the wireless terminal WT can access the external network 2000 by means of a first communication route passing the wireless LAN device WLD3, the wireless LAN device WLD2, and then the wireless LAN devices WLD1, or by means of a second communication route passing the wireless LAN device WLD3, and then the wireless LAN device WLD1 alone. It is to be noted that the personal computer, which is the wireless terminal WT, may realize the wireless communication functionality by having a wireless LAN card, by including a wireless LAN module, or by being connected to the wireless LAN device WLD3 via a USB (universal serial bus).

With the process, to be described in the following, of structuring a wireless communication route, an embodiment in which either the first wireless communication route or the second wireless communication route is structured in an example of the wireless communication system 1000 configured with the one wireless terminal WT and the three wireless LAN devices WLD1 to WLD3 will be described, with the object of facilitating an understanding of the invention. However, the number of wireless terminals and the number of wireless LAN devices are not limited thereto. For example, if there are four wireless LAN devices, there will be five wireless communication routes through which the wireless terminal WT can access the external network 2000. Accordingly, the process of structuring a wireless communication route in that case would be performed for the five wireless communication routes in accordance with the following description. In addition, it is not necessary for the (not WLD1) wireless LAN devices not connected to the external network all to be able to communicate directly with a wireless LAN device (WLD1) that is connected to the external network; via another wireless LAN device, indirectly they may communicate with a wireless LAN device that is connected to the external network.

Hereinafter, the internal configurations of the wireless LAN devices WLD1 to WLD3 of the present invention, and the process of structuring a wireless communication route, which is realized by the wireless LAN devices WLD1 to WLD3 and the wireless terminal WT, will be described in detail with reference to the drawings. It is to be noted that since, as described above, the internal configurations of the wireless LAN devices WLD1 to WLD3 are the same, the wireless LAN devices WLD1 to WLD3 are simply referred to as "wireless LAN devices" when the wireless LAN devices WLD1 to WLD3 do not need to be discriminated from each other in the description.

First Embodiment

Figure 2:
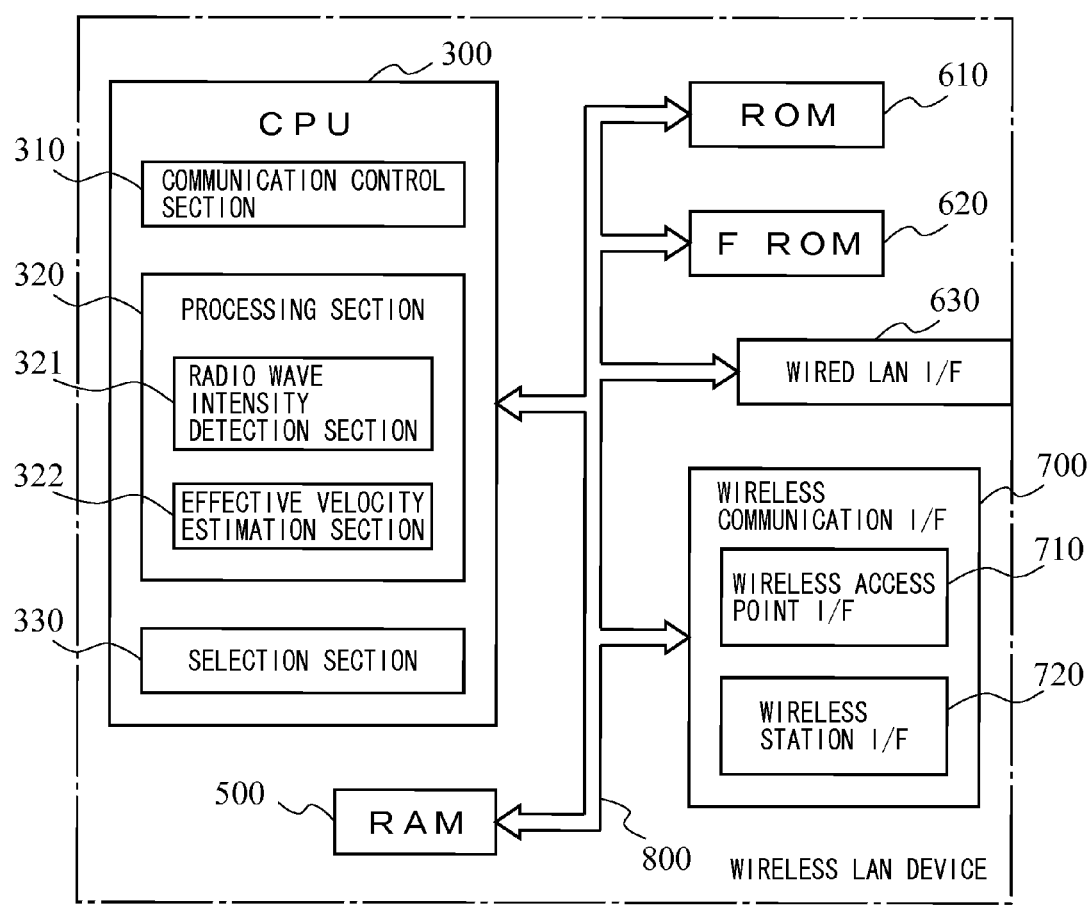
FIG. 2 is a diagram showing the internal configuration of a wireless LAN device according to the first embodiment of the present invention.

FIG. 2 is a diagram showing the internal configuration of each wireless LAN device of the first embodiment of the present invention. The wireless LAN device of the first embodiment includes a CPU (central processing unit) 300, a RAM (random access memory) 500, a ROM (read only memory) 610, a flash ROM 620, a wired LAN interface (I/F) 630, and a wireless communication interface (I/F) 700. The CPU 300, the RAM 500, the ROM 610, the flash ROM 620, the wired LAN interface 630, and the wireless communication interface 700 are connected to each other via a bus 800.

First, the outline of the configuration of each wireless LAN device of the first embodiment will be described.

The CPU 300 loads, onto the RAM 500, a computer program such as firmware stored in the flash ROM 620 or the ROM 610, and executes the computer program, thereby controlling the overall operation of the wireless LAN device. In addition, by executing the computer program, the CPU 300 functions as a communication control section 310, a processing section 320, and a selection section 330. The processing section 320 has functions as a radio wave intensity detection section 321 and an effective velocity estimation section 322.

The communication control section 310 transmits information about whether or not the wireless LAN device is connected to the router RT, information about an effective velocity estimated, and the like, to another wireless LAN device, by using a beacon compliant with the IEEE 802.11 standard. The radio wave intensity detection section 321 detects the intensity of radio wave of a beacon received from another wireless LAN device. The effective velocity estimation section 322 estimates an effective velocity of communication with the other wireless LAN device from which the beacon has been received. The selection section 330 selects a wireless LAN device to be connected, based on an effective velocity estimated.

The wired LAN interface 630 transmits information to and receives information from the router RT via a LAN cable. The wireless communication interface 700 is an interface for establishing wireless communication between the wireless LAN device and another wireless LAN device, and includes a wireless access point interface (I/F) 710 and a wireless station interface (I/F) 720. The wireless access point interface 710 functions as an access point, to transmit a packet to and receive a packet from a station. The wireless station interface 720 functions as a station, to transmit a packet to and receive a packet from another wireless communication device functioning as an access point. That is, each wireless LAN device functions as both an access point and a station. The wireless access point interface 710 and the wireless station interface 720 are included in the wireless LAN device in the state where they can transmit a radio wave to the outside and receive a radio wave from the outside. It is to be noted that the wireless access point interface 710 and the wireless station interface 720 may be included in one wireless module, or may be included in respective modules.

It is to be noted that a wireless communication function section (not shown) of the wireless terminal WT does not have a function as an access point. Therefore, it can be considered that the internal configuration of the wireless communication function section is equivalent to the configuration obtained by removing the wireless access point interface 710 from the internal configuration of the wireless LAN device shown in FIG. 2.

Figure 4:
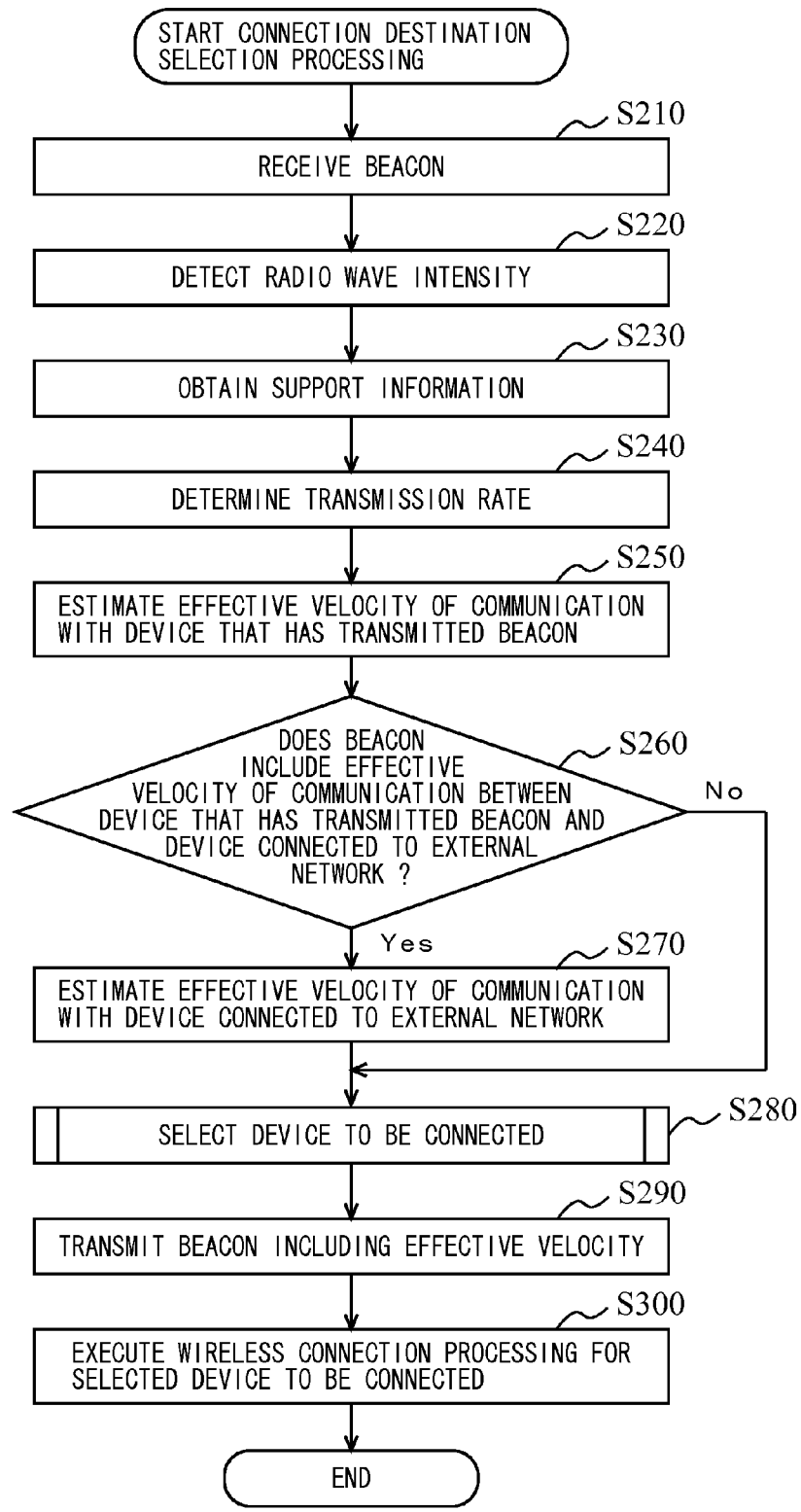
FIG. 4 is a flowchart showing a flow of connection destination selection processing performed by the wireless LAN device of the first embodiment.
Figure 5:
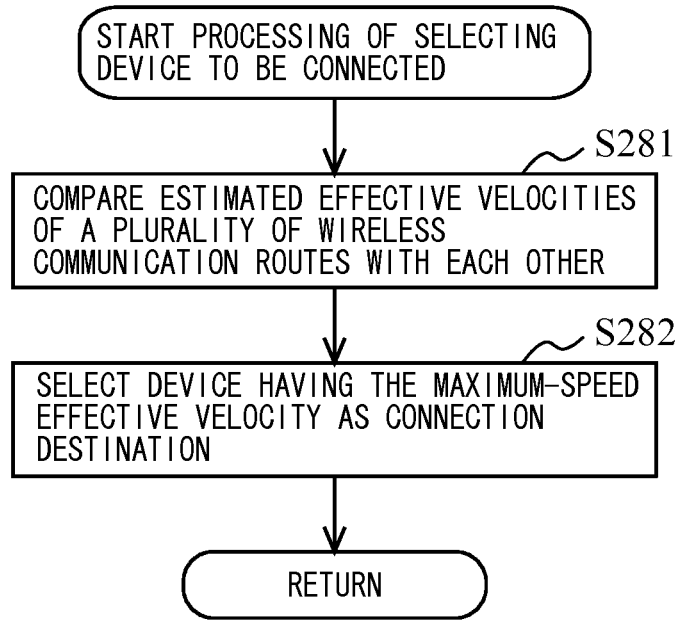
FIG. 5 is a flowchart showing a detailed flow of processing of step S280 in FIG. 4.

Next, with reference to FIG. 3 to FIG. 5, the processing of structuring a wireless communication route, which is performed in the wireless communication system 1000 including the wireless LAN devices and the wireless terminal WT of the first embodiment, will be described.

Figure 3:
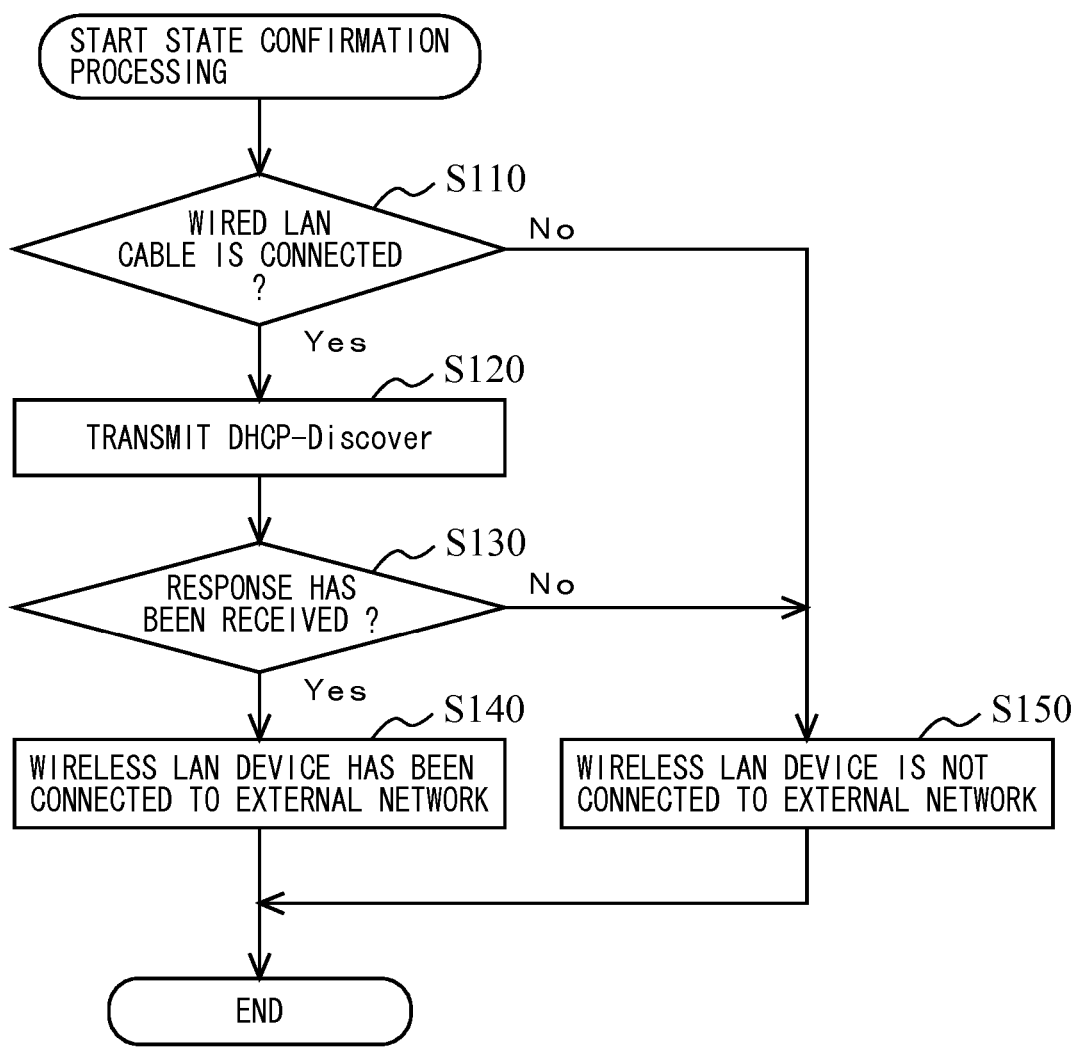
FIG. 3 is a flowchart showing a flow of state confirmation processing performed by the wireless LAN device of the first embodiment.

FIG. 3 is a flowchart showing a flow of state confirmation processing performed by the wireless LAN device of the first embodiment. FIG. 4 is a flowchart showing a flow of connection destination selection processing performed by the wireless LAN device, of the first embodiment, that is not connected to the external network. FIG. 5 is a flowchart showing, in detail, processing of step S280 shown in FIG. 4.

The state confirmation processing shown in FIG. 3 will be described. If a request for selecting another wireless LAN device for relaying a packet, which is caused by, for example, the wireless LAN device being powered on or a button being pressed, is detected, the communication control section 310 of the wireless LAN device determines whether or not a LAN cable is connected to the wired LAN interface 630 (step S110). If a LAN cable is connected to the wired LAN interface 630 (YES in step S110), the communication control section 310 transmits a DHCP-Discover message via the wired LAN interface 630 and the LAN cable (step S120).

Thereafter, the communication control section 310 determines whether or not a response to the DHCP-Discover message has been received (step S130). Specifically, the communication control section 310 determines whether or not a DHCP-Offer message has been received via the LAN cable and the wired LAN interface 630 within a predetermined time period after the DHCP-Discover message was transmitted. In the present embodiment, since the router RT has a gateway function and a DHCP function, the wireless LAN device is configured to determine whether or not the wireless LAN device has been connected to the external network 2000, based on whether or not a response to a DHCP-Discover message has been received. However, a method other than the above method may be used for determining whether or not the wireless LAN device is connected to an external network.

If a response to the DHCP-Discover message has been received (YES in step S130), the wireless LAN device determines that the wireless LAN device has been connected to an external network via the wired LAN interface 630 (step S140). The wireless LAN device in this case corresponds to the wireless LAN device WLD1 in the wireless communication system 1000 shown in FIG. 1. The wireless LAN device WLD1 corresponds to a "designated wireless communication device" in claims. The wireless LAN device that is connected to the external network finishes the processing without performing processing (connection destination selection processing shown in FIG. 4) of selecting another wireless LAN device as a connection destination. It is to be noted that in this case, the wireless LAN device transmits, to other wireless LAN devices, beacons including indicator information indicating that the wireless LAN device is connected to the external network. For example, the indicator information may be written in an optional area, prepared in a beacon frame compliant with the IEEE 802.11 standard, that a vendor can freely define.

On the other hand, if a LAN cable is not connected to the wired LAN interface 630 (NO in step S110), or if a response to the DHCP-Discover message has not been received (NO in step S130), the wireless LAN device determines that the wireless LAN device is not connected to an external network via the wired LAN interface 630 (step S150). The wireless LAN device in this case corresponds to the wireless LAN device WLD2 or WLD3 in the wireless communication system 1000 shown in FIG. 1. Each of the wireless LAN device WLD2 or WLD3 corresponds to "wireless communication device" in claims. The wireless LAN device that is not connected to the external network performs the connection destination selection processing shown in FIG. 4, to structure a wireless communication route from the wireless terminal WT to the external network 2000.

The connection destination selection processing shown in FIG. 4 will be described. The communication control section 310 of the wireless LAN device receives a plurality of beacons transmitted from another wireless LAN device (step S210). In the present embodiment, the wireless LAN device WLD2 receives a plurality of beacons from each of the wireless LAN devices WLD1 and WLD3, and the wireless LAN device WLD3 receives a plurality of beacons from each of the wireless LAN devices WLD1 and WLD2. The radio wave intensity detection section 321 of the wireless LAN device detects the intensities of radio waves of the received beacons (step S220). Specifically, the radio wave intensity detection section 321 detects RSSI (received signal strength indication) values from the received beacons. In the present embodiment, the radio wave intensity detection section 321 detects the RSSI values of a plurality of beacons transmitted from each wireless LAN device, and calculates the average value of the RSSI values as a final RSSI value. As a result, an influence of error in detection of RSSI values can be reduced in the subsequent steps of processing.

The effective velocity estimation section 322 of the wireless LAN device obtains support information about a transmission rate that can be used in wireless communication, which information is included in beacons received from another wireless LAN device (step S230). Support information about a transmission rate is included in a beacon compliant with the IEEE 802.11 standard, and indicates a transmission rate supported by a wireless LAN device. For example, in the case where the wireless LAN device WLD1 is compliant with the IEEE 802.11a standard, beacons transmitted from the wireless LAN device WLD1 include a transmission rate such as 6, 9, 12, 18, 24, 36, 48, or 54 [Mbps], and in the case where the wireless LAN device WLD1 is compliant with the IEEE 802.11g standard, beacons transmitted from the wireless LAN device WLD1 include a transmission rate such as 1, 2, 5.5, 6, 9, 11, 12, 18, 24, 36, 48, or 54 [Mbps].

The effective velocity estimation section 322 of the wireless LAN device determines a transmission rate Vmax between the wireless LAN device and the other wireless LAN device which has transmitted the beacons, based on the obtained support information (step S240). In the present embodiment, the wireless LAN device stores, in the ROM 610, the transmission rate that the wireless LAN device supports. In addition, the wireless LAN device stores, in the ROM 610, an RSSI-value transmission-rate correspondence table including RSSI values and the ranges of transmission rates corresponding to the respective RSSI values. The RSSI value-transmission rate correspondence table indicates the correspondence relationship between the RSSI value detected in step S220 and the upper limit value of the transmission rate to be determined. In general, the smaller a transmission rate is, the longer the distance of communication that wireless LAN devices can perform is. Therefore, the RSSI-value transmission-rate correspondence table prescribes the RSSI values and the transmission rates such that the larger the RSSI value is, the larger the upper limit value of the transmission rate to be determined is, and the smaller the RSSI value is, the smaller the upper limit value of the transmission rate to be determined is.

The effective velocity estimation section 322 compares the RSSI value detected in step S220 with the RSSI-value transmission-rate correspondence table stored in the ROM 610, thereby specifying the upper limit value of the transmission rate corresponding to the detected RSSI value. The effective velocity estimation section 322 determines, as the transmission rate Vmax between the wireless LAN device and the other wireless LAN device, the largest transmission rate [Mbps] within a range up to the specified upper limit value of the transmission rate, among transmission rates that are commonly supported by the wireless LAN device and the other wireless LAN device. In the present embodiment, the wireless LAN device WLD2 determines a transmission rate Vmax12 between the wireless LAN device WLD1 and the wireless LAN device WLD2, and a transmission rate Vmax32 between the wireless LAN device WLD3 and the wireless LAN device WLD2, and the wireless LAN device WLD3 determines a transmission rate Vmax13 between the wireless LAN device WLD1 and the wireless LAN device WLD3, and a transmission rate Vmax23 between the wireless LAN device WLD2 and the wireless LAN device WLD3.

It is to be noted that although the present embodiment has described the case where the RSSI-value transmission-rate correspondence table indicates the correspondence relationship between the RSSI value and the upper limit value of the transmission rate to be determined, the RSSI-value transmission-rate correspondence table may have a configuration other than the above. For example, the RSSI-value transmission-rate correspondence table may indicate the correspondence relationship between the RSSI value and the range of a transmission rate to be determined, or may indicate the correspondence relationship between the RSSI value and the lower limit value of the transmission rate to be determined.

In addition, although the effective velocity estimation section 322 of the wireless LAN device determines the transmission rate Vmax between the wireless LAN device and the other wireless LAN device by using the RSSI-value transmission-rate correspondence table in the present embodiment, the effective velocity estimation section 322 may determine the transmission rate Vmax by another method. For example, regardless of the RSSI value detected in step S220, the effective velocity estimation section 322 of the wireless LAN device may compare the wireless transmission rates supported by the wireless LAN device which is stored in the ROM 610, with the transmission rates supported by the other wireless LAN device, and may determine the largest transmission rate [Mbps] that is commonly supported by the wireless LAN device and the other wireless LAN device, as the transmission rate Vmax between the wireless LAN device and the other wireless LAN device.

In addition, the wireless LAN device may store an SNR transmission-rate correspondence table including SNRs (signal-to-noise ratios) and the ranges of transmission rates corresponding to the respective SNRs, instead of the RSSI-value transmission-rate correspondence table. In this case, the effective velocity estimation section 322 detects an SNR from the beacons received in step S210, compares the detected SNR with the SNR transmission-rate correspondence table stored in the ROM 610, and specifies the upper limit value of the transmission rate corresponding to the detected SNR. The effective velocity estimation section 322 determines, as the transmission rate Vmax between the wireless LAN device and the other wireless LAN device, the largest transmission rate [Mbps] within a range up to the specified upper limit value of the transmission rate, among transmission rates that are commonly supported by the wireless LAN device and the other wireless LAN device.

After determining the transmission rate Vmax between the wireless LAN device and the other wireless LAN device in step S240, the effective velocity estimation section 322 estimates an effective velocity V of communication between the wireless LAN device and the other wireless LAN device (step S250). In the present embodiment, the wireless LAN device stores, in the ROM 610, an RSSI-value effective-ratio correspondence table including RSSI values and effective ratios R corresponding to the respective RSSI values, the effective ratios R being the ratios of effective velocities to transmission rates. The RSSI-value effective-ratio correspondence table indicates the correspondence relationship between the RSSI value detected in step S220 and the ratio of the effective velocity to the transmission rate determined in step S240. In general, the longer the distance between access points is, the smaller the effective velocity of communication is. Therefore, the RSSI-value effective-ratio correspondence table prescribes the RSSI values and the effective ratios R such that the larger the RSSI value is, the larger the effective ratio R is, and the smaller the RSSI value is, the smaller the effective ratio R is.

The effective velocity estimation section 322 compares the detected RSSI value with the RSSI-value effective-ratio correspondence table stored in the ROM 610, thereby specifying an effective ratio Ri corresponding to the detected RSSI value. The effective velocity estimation section 322 determines, as an estimated value of the effective velocity V, the specified effective ratio Ri multiplied by the determined transmission rate Vmax. That is, the effective velocity V, the transmission rate Vmax, and the effective ratio Ri have a relationship represented by the following expression (1).

$$V = V\text{max} \times Ri \quad (1)$$

In the present embodiment, the wireless LAN device WLD2 estimates an effective velocity V12 ($=V\text{max}12 \times Ri$) between the wireless LAN device WLD1 and the wireless LAN device WLD2, and an effective velocity V32 ($=V\text{max}32 \times Ri$) between the wireless LAN device WLD3 and the wireless LAN device WLD2, and the wireless LAN device WLD3 estimates an effective velocity V13 ($=V\text{max}13 \times Ri$) between the wireless LAN device WLD1 and the wireless LAN device WLD3, and an effective velocity V23 ($=V\text{max}23 \times Ri$) between the wireless LAN device WLD2 and the wireless LAN device WLD3.

It is to be noted that in the present embodiment, the effective velocity estimation section 322 does not directly use the effective velocity V estimated from the expression (1), but uses the average value of effective velocities estimated from the expression (1), as the effective velocity V. The average value may be obtained from every predetermined number of (for example, 100) effective velocities estimated from the expression (1), or may be obtained from all effective velocities, estimated from the expression (1), that have been accumulated. As a result, it is possible to prevent the amount of variation in the effective value V from increasing owing to variation of the RSSI value detected in step S220.

In addition, although the present embodiment has described the case where the effective velocity estimation section 322 specifies the effective ratio Ri from the RSSI-value effective-ratio correspondence table, any method may be employed for the effective velocity estimation section 322 to specify the effective ratio Ri. For example, instead of the RSSI-value effective-ratio correspondence table, the wireless LAN device may store, in the ROM 610, set RSSI values that are set in advance in a predetermined manner, and may use, as the effective ratio Ri, the ratio of the detected RSSI value to the set RSSI value.

In addition, although the present embodiment has described the case where the effective velocity estimation section 322 specifies the effective ratio Ri from the detected RSSI value, the effective velocity estimation section 322 may specify the effective ratio Ri by using a value other than the RSSI value. For example, the wireless LAN device may store, in the ROM 610, an SNR effective-ratio correspondence table including SNRs and effective ratios R corresponding to the respective SNRs. Then, the effective velocity estimation section 322 may detect the SNR from the beacons received in step S210, compare the detected SNR with the SNR effective-ratio correspondence table stored in the ROM 610, and specify the effective ratio Ri corresponding to the detected SNR.

After completing the estimation of the effective velocity V between the wireless LAN device and the other wireless LAN device which has transmitted a beacon, the effective velocity estimation section 322 estimates an effective velocity V between the wireless LAN device, and the wireless LAN device connected to the external network. In the present embodiment, this processing corresponds to processing of estimating an effective velocity V of a route from the wireless LAN device WLD1, through the wireless LAN device WLD2, to the wireless LAN device WLD3. It is to be noted that, actually, processing of estimating an effective velocity V of a route from the wireless LAN device WLD1, through the wireless LAN device WLD3, to the wireless LAN device WLD2, is also performed. However, the description of this processing will be omitted because this processing is not needed to be performed in the present embodiment where the wireless terminal WT is connected to the wireless LAN device WLD3.

The effective velocity estimation section 322 determines whether or not the beacon received in step S210 includes information about an effective velocity V of communication between the wireless LAN device that has transmitted the beacon and the wireless LAN device connected to the external network (step S260). As described above, the wireless LAN device WLD1 connected to the external network transmits a beacon including, in its optional area, indicator information indicating that the wireless LAN device WLD1 is connected to the external network, and each of the wireless LAN devices WLD2 and WLD3, which are not connected to the external network, transmits a beacon including the estimated effective velocity V (indicator information) in its optional area. Therefore, from which, of the wireless LAN device connected to the external network and a wireless LAN device that is not connected to the external network, the beacon has been transmitted can be determined by referring to the optional area.

If the beacon received in step S210 includes information indicating that the other wireless LAN device that has transmitted the beacon is connected to the external network (NO in step S260), the effective velocity estimation section 322 finishes the effective velocity estimation processing. That is, in this case, a beacon from the wireless LAN device WLD1 has been received by the wireless LAN device WLD3. Therefore, the effective velocity V13 estimated in step S250 is an effective velocity Va13 of the first wireless communication route, which should be obtained.

On the other hand, if the beacon received in step S210 includes indicator information about an effective velocity V of communication between the other wireless LAN device that has transmitted the beacon and the wireless LAN device connected to the external network (YES in step S260), the effective velocity estimation section 322 continues the effective velocity estimation processing as described below (step S270). In this case, a beacon from the wireless LAN device WLD2 has been received by the wireless LAN device WLD3. Therefore, the beacon includes the effective velocity V12 of communication between the wireless LAN device WLD2, and the wireless LAN device WLD1 connected to the external network, which has been estimated by the wireless LAN device WLD2. In addition, in the processing previously described, the effective velocity estimation section 322 of the wireless LAN device WLD3 has already estimated the effective velocity V23 between the wireless LAN device WLD3 and the wireless LAN device WLD2. Therefore, the effective velocity estimation section 322 estimates an effective velocity Vb13 of the second wireless communication route from the wireless LAN device WLD1, through the wireless LAN device WLD2, to the wireless LAN device WLD3, by using the following expression (2).

$$Vb13=(V12 \times V23)/(V12+V23) \quad (2)$$

After estimating the effective velocity V in step S250 or S270, the selection section 330 of the wireless LAN device selects a wireless LAN device to be connected (step S280). As shown in FIG. 5, the selection section 330 compares the effective velocities V of the plurality of wireless communication routes estimated in the effective velocity estimation processing, with each other (step S281). Then, the selection section 330 selects another wireless LAN device that realizes the maximum-speed effective velocity V of communication with the wireless LAN device connected to the external network, from among a plurality of other wireless LAN devices (step S282). In the present embodiment, the selection section 330 compares the effective velocity Va13 of the first wireless communication route from the wireless LAN device WLD1 to the wireless LAN device WLD3 estimated in the effective velocity estimation processing, with the effective velocity Vb13 of the second wireless communication route from the wireless LAN device WLD1, through the wireless LAN device WLD2, to the wireless LAN device WLD3 estimated in the effective velocity estimation processing, and selects one of the wireless LAN devices WLD1 and WLD2 that realizes the faster effective velocity.

After selecting the other wireless LAN device that realizes the maximum-speed effective velocity V, the communication control section 310 of the wireless LAN device transmits, to another wireless LAN device, beacons including, in its optional area, indicator information about the estimated effective velocity V of the maximum-speed wireless communication route which passes the other wireless LAN device selected (step S290). The interval of transmission of the beacons can be set at any value, and is set at about 100 ms in the present embodiment. It is to be noted that processing of the effective velocity estimation section 322 estimating the effective velocity V and processing of the selection section 330 selecting (that is, updating) another wireless LAN device, may be performed every time the communication control section 310 transmits a beacon, or at predetermined intervals. Every time the updating is performed, the communication control section 310 transmits a beacon including information about the effective velocity V of the updated maximum-speed wireless communication route updated.

After completing the transmission of the beacons, the communication control section 310 performs connection processing compliant with the IEEE 802.11 standard, for the other wireless LAN device selected (step S300). As a result, connection among wireless LAN devices used for relaying a packet from the wireless LAN device WLD3 connected to the wireless terminal WT, to the wireless LAN device WLD1 connected to the external network, is established, whereby the maximum-speed wireless communication route is structured.

According to the first embodiment, each of the wireless LAN devices and the wireless terminal included in the wireless communication system 1000 selects, as a relaying destination, a wireless LAN device that realizes the maximum-speed effective velocity of communication with the wireless LAN device connected to the external network, and establishes connection to the selected wireless LAN device. In this way, the wireless communication system 1000 of the present invention can always set an optimum communication route autonomously.

Second Embodiment

The first embodiment has described the case where information about an effective velocity of communication and information about connection to an external network are used as indicator information included in a beacon. The second embodiment will describe the case where a hop count between the wireless LAN device that transmits a beacon and the wireless LAN device connected to an external network is further used as the indicator information.

Figure 6:
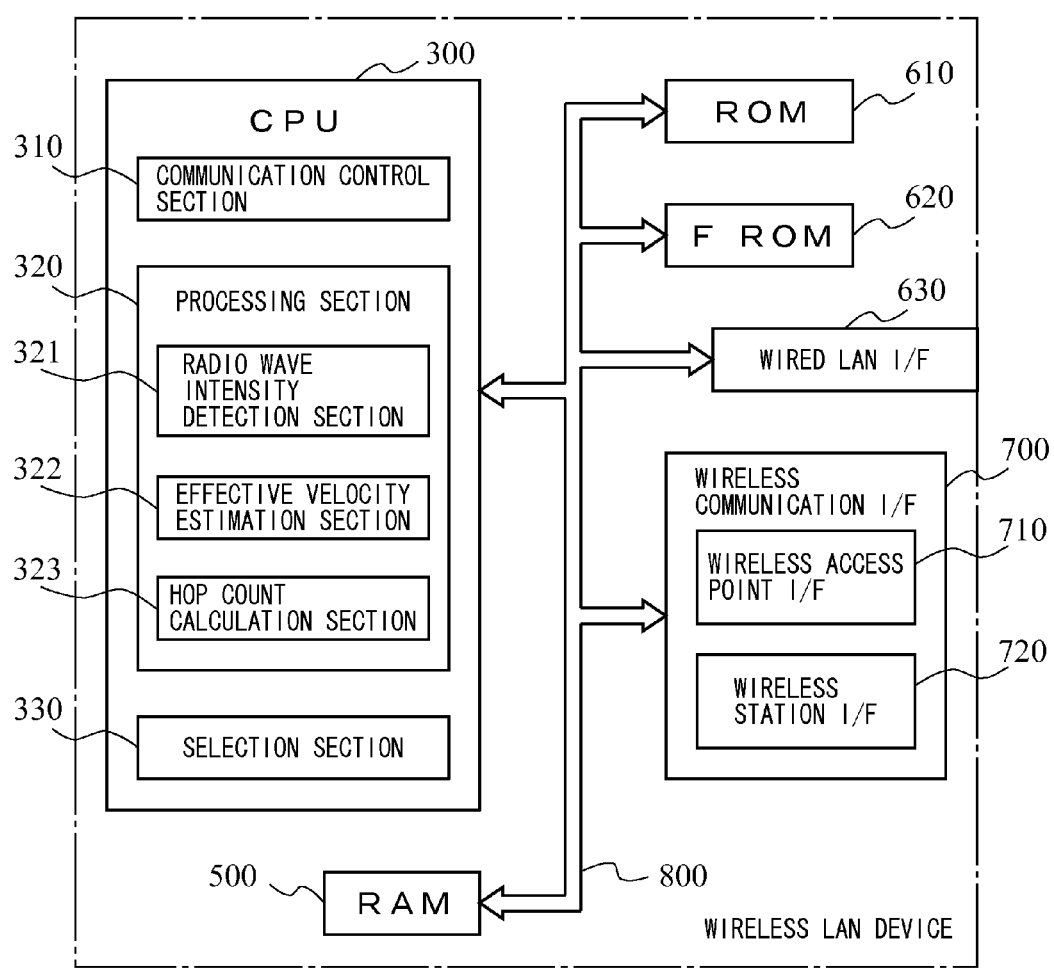
FIG. 6 is a diagram showing the internal configuration of a wireless LAN device according to the second embodiment of the present invention.

FIG. 6 is a diagram showing the internal configuration of a wireless LAN device according to the second embodiment of the present invention. The wireless LAN device of the second embodiment is different from the wireless LAN device of the first embodiment in that the wireless LAN device of the second embodiment further includes a hop count calculation section 323. The CPU 300 executes a computer program stored in the ROM 610 or the like, thereby functioning as the hop count calculation section 323. It is to be noted that the components of the wireless LAN device of the second embodiment other than the hop count calculation section 323 are the same as those of the wireless LAN device of the first embodiment. Therefore, they are denoted by the same reference numerals and the description thereof is omitted.

Figure 7:
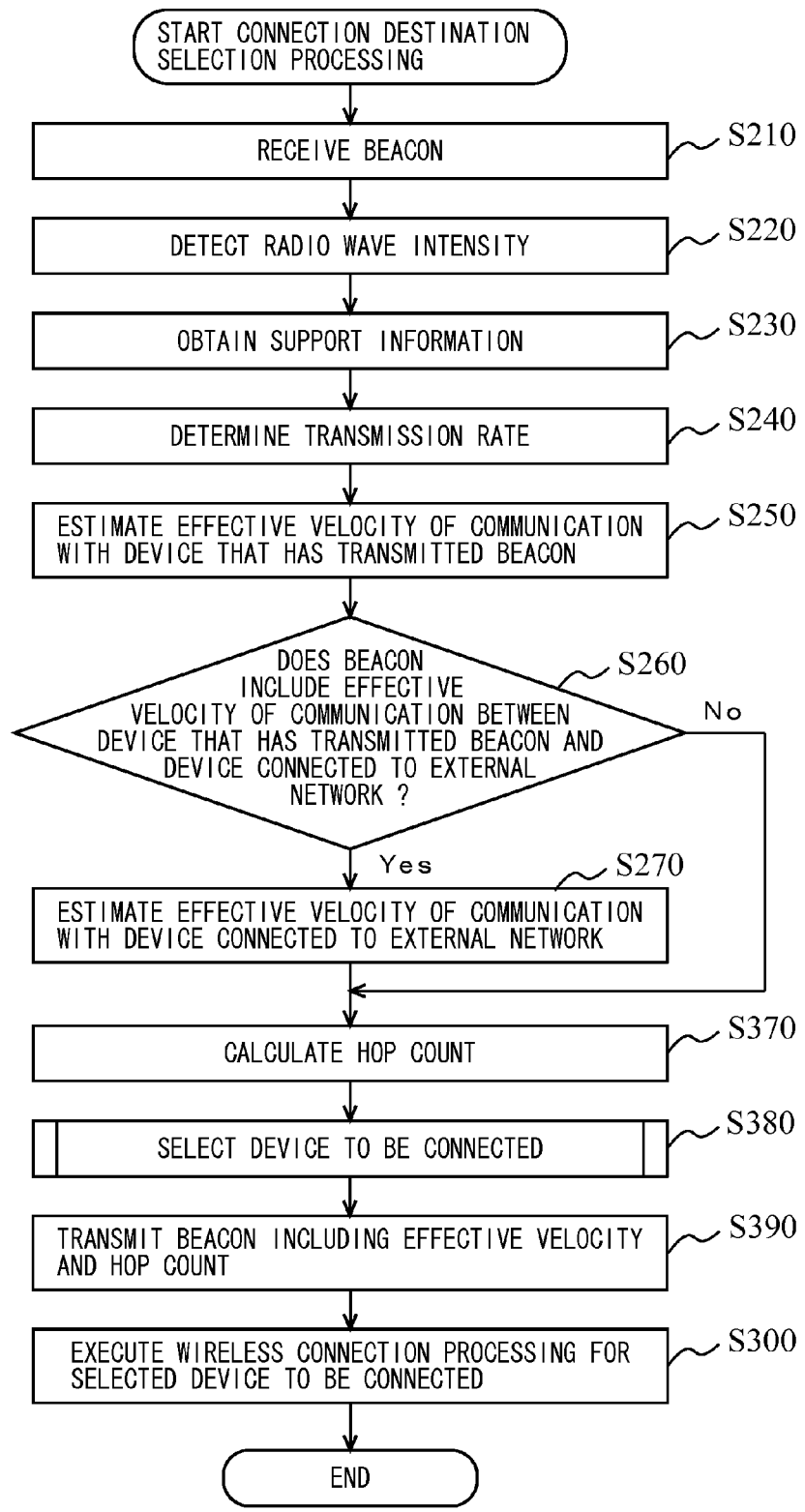
FIG. 7 is a flowchart showing a flow of connection destination selection processing performed by the wireless LAN device of the second embodiment.

With reference to FIG. 7 and FIG. 8, the processing of selecting a wireless communication route, which is performed in the wireless communication system 1000 including the wireless LAN devices and the wireless terminal WT of the second embodiment, will be described.

FIG. 7 is a flowchart showing a flow of connection destination selection processing performed by the wireless LAN device, of the second embodiment, that is not connected to the external network. FIG. 8 is a flowchart showing, in detail, processing of step S380 shown in FIG. 7. It is to be noted that since state confirmation processing of the second embodiment is the same as in the state confirmation processing of the first embodiment (FIG. 3), the description thereof is omitted.

With reference to FIG. 7, processing from a step of the wireless LAN device receiving a beacon from another wireless LAN device to a step of the wireless LAN device estimating an effective velocity V of communication between the wireless LAN device and the other wireless LAN device is the same as in the first embodiment (step S210 to S270). In the second embodiment, after estimating the effective velocity V in step S250 or S270, the hop count calculation section 323 of the wireless LAN device calculates a hop count between the wireless LAN device, and the wireless LAN device connected to the external network (step S370). Specifically, if the hop count calculation section 323 detects, in a beacon received from the other wireless LAN device in step S210, indicator information indicating that the other wireless LAN device is connected to the external network, the hop count calculation section 323 sets the hop count of the wireless LAN device at "1" which indicates the wireless LAN device can directly communicate with the wireless LAN device connected to the external network. The hop count to be set varies in accordance with the number of wireless LAN devices present between the wireless LAN device, and the wireless LAN device connected to the external network, and is incremented by the number of wireless LAN devices present therebetween. For example, if the number of wireless LAN devices present therebetween is 1, the hop count becomes "2", and if the number is 2, the hop count becomes "3". In addition, in the second embodiment, "0" is used as the hop count of the wireless LAN device WLD1 connected to the external network.

After the hop count is calculated in step S370, the selection section 330 of the wireless LAN device selects a wireless LAN device to be connected (step S380). With reference to FIG. 8, the selection section 330 of the wireless LAN device compares the effective velocities V of the plurality of wireless communication routes estimated in the effective velocity estimation processing, with each other (step S281). Here, the selection section 330 determines whether or not two or more wireless LAN devices that realize the maximum-speed effective velocity of communication with the wireless LAN device connected to the external network, are present among the plurality of other wireless LAN devices (step S381). In the second embodiment, the selection section 330 determines whether or not the effective velocity Va13 is equal to the effective velocity Vb13. If, in step S381, the selection section 330 has determined that only one wireless LAN device that realizes the maximum-speed effective velocity is present (NO in step S381), the selection section 330 selects the wireless LAN device that realizes the maximum-speed effective velocity (step S282). On the other hand, if, in step S381, the selection section 330 has determined that two or more wireless LAN devices that realize the maximum-speed effective velocity are present, the selection section 330 compares the hop counts of the two or more wireless LAN devices that realize the maximum-speed effective velocity, with each other, and selects one of the two or more wireless LAN devices that has the smallest hop count (step S382). The reasons for performing such a way of selection are because, for example, a wireless communication route having a small hop count needs a small number of transmissions of a packet among wireless LAN devices, and a risk of interruption of communication due to breakdown of a wireless LAN device can be suppressed.

After the other wireless LAN device that realizes the maximum-speed effective velocity is selected, the communication control section 310 of the wireless LAN device transmits, to another wireless LAN device, a beacon including, its optional area, indicator information about the estimated effective velocity V and the calculated hop count of the maximum-speed wireless communication route which passes the other wireless LAN device selected (step S390). In the present embodiment, the wireless LAN device WLD2 that has received a beacon from the wireless LAN device WLD1 transmits a beacon including indicator information indicating the estimated effective velocity V12 and the hop count "1". In addition, the wireless LAN device WLD3 that has received a beacon from the wireless LAN device WLD1 transmits a beacon including indicator information indicating the estimated effective velocity Va13 and the hop count "1". In addition, the wireless LAN device WLD3 that has received a beacon from the wireless LAN device WLD2 transmits a beacon including indicator information indicating the estimated effective velocity Vb13 and the hop count "2".

It is to be noted that the second embodiment has described, as an example of using a hop count in determination, the case where two or more wireless LAN devices that realize the maximum-speed effective velocity of communication with the wireless LAN device connected to the external network, are present among the plurality of other wireless LAN devices. Other than this case, there are some cases where a hop count is used in determination. For example, hop counts of two or more wireless LAN devices that realize effective velocities V equal to or larger than a predetermined threshold value may be compared with each other, or hop counts of the top several wireless LAN devices that realize the maximum-speed effective velocities V may be compared with each other.

According to the second embodiment, each of the wireless LAN devices and the wireless terminal included in the wireless communication system 1000 selects, as a relaying destination, a wireless LAN device that realizes the maximum-speed effective velocity of communication with the wireless LAN device connected to the external network and makes the hop count the smallest, and establishes connection to the selected wireless LAN device. In this way, the wireless communication system 1000 of the present invention can always set an optimum wireless communication route autonomously.

Third Embodiment

The second embodiment has described the case where a hop count between the wireless LAN device that transmits a beacon and the wireless LAN device connected to an external network is further used as the indicator information. The third embodiment will describe the case where the amount of temporal variation in the effective velocity of communication (hereinafter, referred to as a displacement amount) is further used as the indicator information.

FIG. 9 is a diagram showing the internal configuration of a wireless LAN device according to the third embodiment of the present invention. The wireless LAN device of the third embodiment is different from the wireless LAN device of the first embodiment in that the wireless LAN device of the third embodiment further includes a displacement amount calculation section 324. The CPU 300 executes a computer program stored in the ROM 610 or the like, thereby functioning as the displacement amount calculation section 324. It is to be noted that the components of the wireless LAN device of the third embodiment other than the displacement amount calculation section 324 are the same as those of the wireless LAN device of the first embodiment. Therefore, they are denoted by the same reference numerals and the description thereof is omitted.

Figure 10:
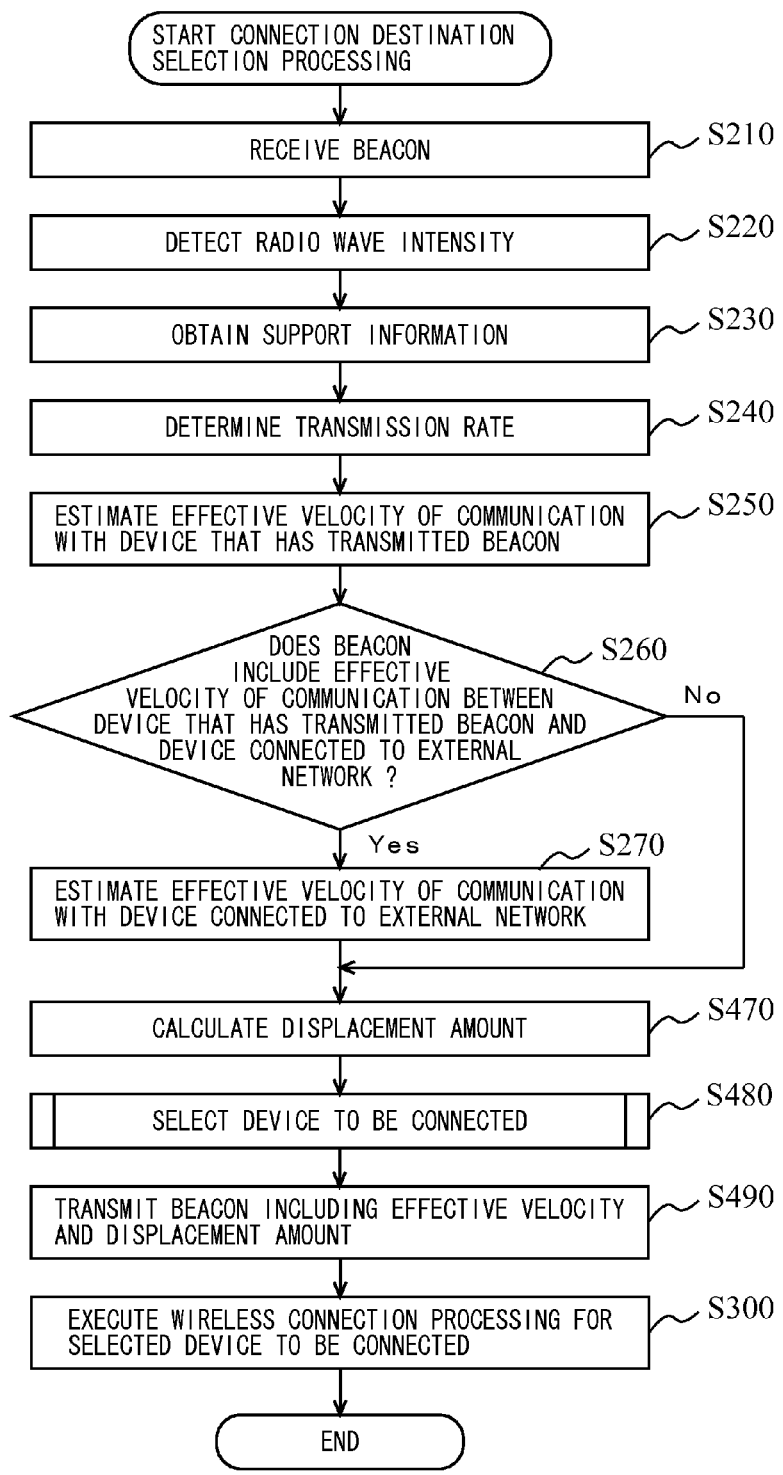
FIG. 10 is a flowchart showing a flow of connection destination selection processing performed by the wireless LAN device of the third embodiment.
Figure 11:
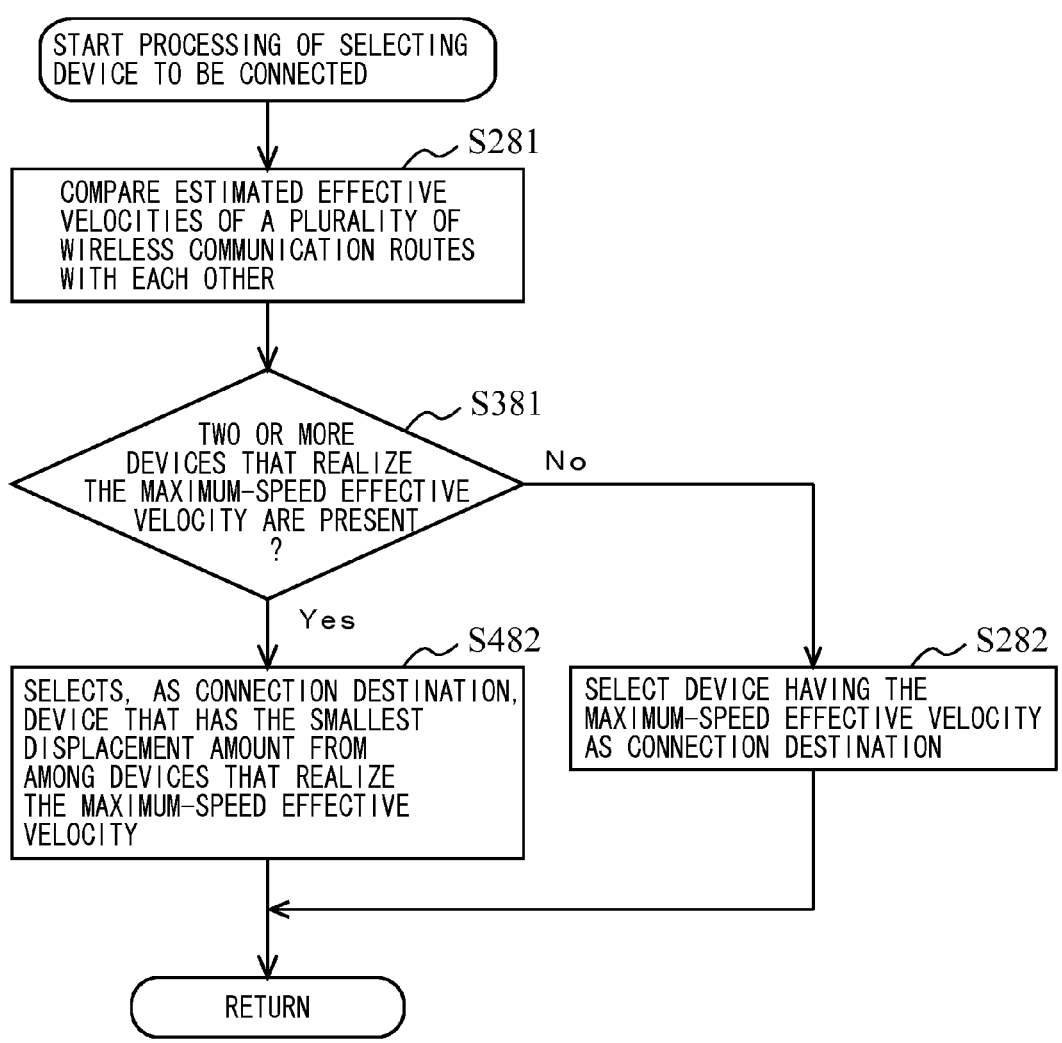
FIG. 11 is a flowchart showing a detailed flow of processing of step S480 in FIG. 10.

With reference to FIG. 10 and FIG. 11, the processing of selecting a wireless communication route, which is performed in the wireless communication system 1000 including the wireless LAN devices and the wireless terminal WT of the third embodiment, will be described.

FIG. 10 is a flowchart showing a flow of connection destination selection processing performed by the wireless LAN device, of the third embodiment, that is not connected to the external network. FIG. 11 is a flowchart showing, in detail, processing of step S480 shown in FIG. 10. It is to be noted that since state confirmation processing of the third embodiment is the same as in the state confirmation processing of the first embodiment (FIG. 3), the description thereof is omitted.

With reference to FIG. 10, processing from a step of the wireless LAN device receiving a beacon from another wireless LAN device to a step of the wireless LAN device estimating an effective velocity V between the wireless LAN device and the other wireless LAN device is the same as in the first embodiment (step S210 to S270). In the third embodiment, after estimating the effective velocity V in step S250 or S270, the displacement amount calculation section 324 calculates a displacement amount D which is the amount of temporal variation in the effective velocity V (step S470). Specifically, since the the wireless LAN device WLD2 is directly connected to the wireless LAN device WLD1, the displacement amount calculation section 324 of the wireless LAN device WLD2 calculates a displacement amount D12 from the effective velocity V12. As described above, the effective velocity estimation section 322 does not directly use the effective velocity V12 estimated from the expression (1), but uses the average value of effective velocities estimated from the expression (1), as the effective velocity V12. The displacement amount calculation section 324 calculates the deviation of each of the effective velocities which the effective velocity estimation section 322 has estimated from the expression (1) for calculating the average value, and outputs the calculated deviation of the effective velocity as the displacement amount D12 of the effective velocity V12.

After the displacement amount is calculated in step S470, the selection section 330 of the wireless LAN device selects a wireless LAN device to be connected (step S480). With reference to FIG. 11, the selection section 330 of the wireless LAN device compares the effective velocities V of the plurality of wireless communication routes estimated in the effective velocity estimation processing, with each other (step S281). Here, the selection section 330 determines whether or not two or more wireless LAN devices that realize the maximum-speed effective velocity of communication with the wireless LAN device connected to the external network, are present among the plurality of other wireless LAN devices (step S381). In the third embodiment, the selection section 330 determines whether or not the effective velocity Va13 is equal to the effective velocity Vb13. If, in step S381, the selection section 330 has determined that only one wireless LAN device that realizes the maximum-speed effective velocity is present (NO in step S381), the selection section 330 selects the wireless LAN device that realizes the maximum-speed effective velocity (step S282). On the other hand, if, in step S381, the selection section 330 has determined that two or more wireless LAN devices that realize the maximum-speed effective velocity are present, the selection section 330 compares the displacement amounts of the two or more wireless LAN devices that realize the maximum-speed effective velocity, with each other, and selects one of the two or more wireless LAN devices that indicates the smallest displacement amount (step S482). In the third embodiment, the selection section 330 compares a displacement amount Da13 of the effective velocity Va13 and a displacement amount Db13 of the effective velocity Vb13 with each other.

After the other wireless LAN device that realizes the maximum-speed effective velocity is selected, the communication control section 310 of the wireless LAN device transmits, to another wireless LAN device, a beacon including, its optional area, indicator information about the estimated effective velocity V and the calculated displacement amount of the maximum-speed wireless communication route which passes the other wireless LAN device selected (step S490). In the present embodiment, the wireless LAN device WLD2 that has received a beacon from the wireless LAN device WLD1 transmits a beacon including indicator information indicating the estimated effective velocity V12 and the displacement amount D12. In addition, the wireless LAN device WLD3 that has received a beacon from the wireless LAN device WLD1 transmits a beacon including indicator information indicating the estimated effective velocity Va13 and the displacement amount Da13. In addition, the wireless LAN device WLD3 that has received a beacon from the wireless LAN device WLD2 transmits a beacon including indicator information indicating the estimated effective velocity Vb13 and the displacement amount Db13.

It is to be noted that the third embodiment has described, as an example of using a displacement amount in determination, the case where two or more wireless LAN devices that realize the maximum-speed effective velocity of communication with the wireless LAN device connected to the external network, are present among the plurality of other wireless LAN devices. Other than this case, there are some cases where a displacement amount is used in determination. For example, displacement amounts of two or more wireless LAN devices that realize effective velocities V equal to or larger than a predetermined threshold value may be compared with each other, or displacement amounts of the top several wireless LAN devices that realize the maximum-speed effective velocities V may be compared with each other.

According to the third embodiment, each of the wireless LAN devices and the wireless terminal included in the wireless communication system 1000 selects, as a relaying destination, a wireless LAN device that realizes the maximum-speed effective velocity of communication with the wireless LAN device connected to the external network and makes the displacement amount the smallest, and establishes connection to the selected wireless LAN device. In this way, the wireless communication system 1000 of the present invention can always set an optimum wireless communication route autonomously.

(Variation 1)

The above embodiments have described the cases where each of the wireless LAN devices performs the connection destination selection processing to select a connection destination. However, the wireless terminal WT may perform the connection destination selection processing to select a wireless LAN device as a connection destination. That is, the processing performed by each wireless LAN device, which is described with reference to FIG. 3 to FIG. 5, FIG. 7, FIG. 8, FIG. 10, and FIG. 11, may be applied, in the same manner, to processing of the wireless terminal WT, which is not connected to the external network, selecting the wireless LAN device WLD3 and establishing connection. It is to be noted that, in this case, since the wireless terminal WT does not have a function as an access point, the wireless terminal WT does not perform the processing of step S290 in FIG. 4, step S390 in FIG. 7, or step S490 in FIG. 10, in which a beacon including indicator information in its optional area is transmitted. The wireless terminal WT is not limited to a general-purpose personal computer described above. The wireless terminal WT may be a mobile phone, a tablet terminal, a game device, a printer, a digital camera, or the like that has a wireless LAN function.

(Variation 2)

The above embodiments have described the case where a beacon is used as a signal including indicator information. However, instead of a beacon, various types of signals transmitted by a wireless LAN device may be used as a signal including indicator information. For example, a probe request transmitted by a wireless LAN device that is functioning as a station, or a probe response transmitted by a wireless LAN device that is functioning as an access point, may be used as a signal including indicator information.

(Variation 3)

In the above embodiments, the effective velocity estimation section 322 estimates the effective velocity in accordance with the RSSI value of a received beacon. However, the effective velocity estimation section 322 may estimate the effective velocity by further using another parameter in addition to the RSSI value. For example, a correspondence table including combinations of RSSI values and SNRs, and transmission rates corresponding to the respective combinations, and a correspondence table including combinations of RSSI values and SNRs, and effective ratios corresponding to the respective combinations, may be prepared, and the effective velocity estimation section 322 may estimate the effective velocity by using the correspondence tables. If such a correspondence table including combinations of RSSI values and SNRs as a parameter is used for the estimation of the effective velocity, it becomes possible to estimate the effective velocity with a high accuracy considering the influence of noise and the like.

(Variation 4)

In the above embodiments, the radio wave intensity detection section 321 detects an RSSI value as the intensity of a radio wave. However, the value that the radio wave intensity detection section 321 detects is not limited to an RSSI value. Other than an RSSI value, the radio wave intensity detection section 321 may detect any parameter that is in proportion to the intensity of reception [dBm]. In addition, in the above embodiments, the effective velocity estimation section 322 estimates the effective velocity from a received beacon. However, a method for estimating the effective velocity is not limited to the method using a beacon. For example, the effective velocity estimation section 322 may estimates the effective velocity, by exchange of Echo messages with a wireless LAN device that is a candidate of a connection destination.

(Variation 5)

In the above embodiments, the wireless LAN devices WLD1 to WLD3 have the same internal configurations. However, a part of the internal configuration that is not used may be omitted. For example, since the wireless LAN device WLD1 is connected to the external network 2000, the wireless LAN device WLD1 may not have components (the processing section 320, the selection section 330, and the like) for performing the connection destination selection processing as long as the wireless LAN device WLD1 has an internal configuration for transmitting a beacon including information indicating that the wireless LAN device WLD1 is connected to the external network.

In the above embodiments, the CPU 300 loads, onto the RAM 500, a computer program such as firmware stored in the flash ROM 620 or the ROM 610, and executes the computer program, thereby realizing the functions of the wireless LAN device. However, in the present invention, the functions may be realized by hardware or software as appropriate. In addition, in the present invention, in the case where a part or all of the functions are realized by software, a computer-readable storage medium may have stored therein the software (computer program). In the present invention, "computer-readable storage media" include a storage medium such as a flexible disc or a CD-ROM, an internal storage device of a computer such as a RAM or a ROM, an external storage device fixed to a computer such as a hard disc.

While the invention has been described in detail, the foregoing description is in all aspects illustrative and not restrictive. It will be understood that numerous other modifications and variations can be devised without departing from the scope of the invention.

What is claimed is:

1. A wireless communication device in a wireless communication system including a designated wireless relay device connected to an external network, and a plurality of wireless communication devices directly or indirectly connectable to the designated wireless relay device wirelessly, the plurality of the wireless communication devices including a wireless terminal and at least one other wireless relay device different from the designated wireless relay device, the wireless communication device comprising:

circuitry configured to estimate effective velocities of communication on a plurality of wireless communication routes structurable between said wireless communication device and the designated wireless relay device; and select as a connection destination one of the designated wireless relay device and the at least one other wireless relay device such that, among the plurality of wireless communication routes, a maximum-speed wireless communication route, being a wireless communication route having the maximum-speed effective velocity estimated by the estimating, is structured, wherein the plurality of wireless communication routes include a first wireless communication route which directly connects said wireless communication device to the designated wireless relay device wirelessly, and a second wireless communication route which connects said wireless communication device to the designated wireless relay device through at least one of the at least one other wireless relay device wirelessly.

2. The wireless communication device according to claim 1, further comprising:

a communication interface configured to transmit indicator information relating to the effective velocity of the maximum-speed wireless communication route, being that which one of the designated wireless relay device and the at least one other wireless relay device, having been selected, structures, and to receive indicator information transmitted from one of the at least one other wireless relay device, wherein:

the circuitry is further configured to use the effective velocity included in the indicator information received by the communication interface to estimate the effective velocity of a wireless communication route the designated wireless relay device passing at least one of the at least one other wireless relay device having transmitted the indicator information.

3. The wireless communication device according to claim 1, wherein the circuitry is further configured to detect a radio-wave intensity of signals received from the designated wireless relay device or the at least one other wireless relay device, and based on the radio-wave intensity, estimate the effective velocities of the plurality of wireless communication routes.

4. A wireless communication device in a wireless communication system including a designated wireless device connected to an external network, and a plurality of wireless communication devices directly or indirectly connectable to the designated wireless device, the wireless communication device comprising:
    circuitry configured to
        estimate effective velocities of communication on a plurality of wireless communication routes structurable between said wireless communication device and the designated wireless device;
        select as a connection destination one of the designated wireless device and the wireless communication device such that, among the plurality of wireless communication routes, a maximum-speed wireless communication route, being a wireless communication route having the maximum-speed effective velocity estimated by the estimating, is structured;
        calculate a hop count indicating a number of other wireless communication devices intervening between said wireless communication device and the designated wireless device, on each of the plurality of wireless communication routes; and
        select, when a plurality of maximum-speed wireless communication routes are present, as a connection destination one of the designated wireless device and the wireless communication devices other than said wireless communication device such that the maximum-speed wireless communication route having a smallest hop count is structured.

5. The wireless communication device according to claim 4, further comprising:
    a communication interface configured to transmit indicator information relating to the effective velocity and the hop count of the selected maximum-speed wireless communication route, and to receive indicator information transmitted from another wireless communication device, wherein:
    the circuitry is further configured to
        use the effective velocity included in the indicator information received by the communication interface to estimate the effective velocity of a wireless communication route to the designated wireless device passing the other wireless communication device having transmitted the indicator information; and
        select, when a plurality of maximum-speed wireless communication routes are present, based on the calculated hop count and the hop count included in the indicator information received by the communication interface, as a connection destination one of the designated wireless communication device and the wireless communication devices other than said wireless communication device such that a maximum-speed wireless communication route is structured.

6. A wireless communication device in a wireless communication system including a designated wireless device connected to an external network, and a plurality of wireless communication devices directly or indirectly connectable to the designated wireless device, the wireless communication device comprising:
    circuitry configured to
        estimate effective velocities of communication on a plurality of wireless communication routes structurable between said wireless communication device and the designated wireless device;
        select as a connection destination one of the designated wireless device and the wireless communication device such that, among the plurality of wireless communication routes, a maximum-speed wireless communication route, being a wireless communication route having the maximum-speed effective velocity estimated by the estimating, is structured;
        calculate an amount of temporal variation in the effective velocity of communication on each of the plurality of wireless communication routes; and
        select, when a plurality of maximum-speed wireless communication routes are present, as a connection destination one of the designated wireless device and the wireless communication devices other than said wireless communication device such that the maximum-speed wireless communication route in which the amount of temporal variation in effective velocity is smallest is structured.

7. The wireless communication device according to claim 6, further comprising:
    a communication interface configured to transmit indicator information relating to the effective velocity, and to the amount of temporal variation in the effective velocity, of the selected maximum-speed wireless communication route, and to receive indicator information transmitted from another wireless communication device, wherein:
    the circuitry is further configured to
        use the effective velocity included in the indicator information received by the communication interface to estimate the effective velocity of a wireless communication route to the designated wireless device passing the other wireless communication device having transmitted the indicator information; and
        select, when a plurality of maximum-speed wireless communication routes are present, based on the calculated amount of temporal variation in the effective velocity and the amount of temporal variation in the effective velocity included in the indicator information received by the communication interface, as a connection destination one of the designated wireless device and the wireless communication devices other than said wireless communication device such that a maximum-speed wireless communication route is structured.

8. A wireless communication system comprising:
    a designated wireless relay device connected to an external network; and
    a plurality of wireless communication devices directly or indirectly connectable to the designated wireless relay device wirelessly, wherein
    the plurality of the wireless communication devices include a wireless terminal and at least one other wireless relay device different from the designated wireless relay device,
    wherein each of the plurality of wireless communication devices includes circuitry configured to
        estimate effective velocities of communication on a plurality of wireless communication routes structurable between said wireless communication device and the designated wireless relay device; and select as a connection destination one of the designated wireless relay device and the at least one other wireless relay device such that, among the plurality of wireless communication routes, a maximum-speed wireless communication route, being a wireless communication route having the maximum-speed effective velocity estimated by the estimating, is structured, and the plurality of wireless communication routes include a first wireless communication route which directly connects said wireless communication device to the designated wireless relay device wirelessly, and a second wireless communication route which connects said wireless communication device to the designated wireless relay device through at least one of the at least one other wireless relay device wirelessly.

9. The wireless communication system according to claim 8, wherein each of the plurality of wireless communication devices further includes a communication interface configured to transmit indicator information relating to the effective velocity of the maximum-speed wireless communication route, being that which one of the designated wireless relay device and the at least one other wireless relay device that has been selected, structures, and to receive indicator information transmitted from one of the at least one other wireless relay device; and the circuitry is further configured to use the effective velocity included in the indicator information received by the communication interface to estimate the effective velocity of a wireless communication route, to the designated wireless relay device, passing at least one of the at least one other wireless relay device having transmitted the indicator information.

10. The wireless communication system according to claim 8, wherein the circuitry is further configured to detect a radio-wave intensity of signals received from the designated wireless relay device or the at least one other wireless relay device, and based on the radio-wave intensity, estimate the effective velocities of the plurality of wireless communication routes.

11. A wireless communication system comprising:

a designated wireless communication device connected to an external network; and a plurality of wireless communication devices directly or indirectly connectable to the designated wireless communication device, wherein each of the plurality of wireless communication devices includes circuitry configured to estimate effective velocities of communication on a plurality of wireless communication routes structurable between said wireless communication device and the designated wireless communication device;

select as a connection destination one of the designated wireless communication device and the wireless communication devices other than said wireless communication device such that, among the plurality of wireless communication routes, a maximum-speed wireless communication route, being a wireless communication route having the maximum-speed effective velocity estimated by the estimating, is structured;

calculate a hop count indicating a number of other wireless communication devices intervening between the wireless communication device and the designated wireless communication device, on each of the plurality of wireless communication routes; and select, when a plurality of maximum-speed wireless communication routes are present, as a connection destination one of the designated wireless communication device and the wireless communication devices other than said wireless communication device such that the maximum-speed wireless communication route having a smallest hop count is structured.

12. The wireless communication system according to claim 11, wherein:

each of the plurality of wireless communication devices further includes a communication interface configured to transmit indicator information relating to the effective velocity and the hop count of the selected maximum-speed wireless communication route, and to receive indicator information transmitted from another wireless communication device; and the circuitry is further configured to use the effective velocity included in the indicator information received by the communication interface to estimate the effective velocity of a wireless communication route to the designated wireless communication device passing the other wireless communication device having transmitted the indicator information; and select, when a plurality of maximum-speed wireless communication routes are present, based on the calculated hop count and the hop count included in the indicator information received by the communication interface, as a connection destination one of the designated wireless communication device and the wireless communication devices other than said wireless communication device such that a maximum-speed wireless communication route is structured.

13. A wireless communication system comprising:

a designated wireless communication device connected to an external network; and a plurality of wireless communication devices directly or indirectly connectable to the designated wireless communication device, wherein each of the plurality of wireless communication devices includes circuitry configured to estimate effective velocities of communication on a plurality of wireless communication routes structurable between said wireless communication device and the designated wireless communication device;

select as a connection destination one of the designated wireless communication device and the wireless communication devices other than said wireless communication device such that, among the plurality of wireless communication routes, a maximum-speed wireless communication route, being a wireless communication route having the maximum-speed effective velocity estimated by the estimating, is structured;

calculate an amount of temporal variation in the effective velocity of communication on each of the plurality of wireless communication routes; and select, when a plurality of maximum-speed wireless communication routes are present, as a connection destination one of the designated wireless communication device and the wireless communication devices other than said wireless communication device such that the maximum-speed wireless communication route in which the amount of temporal variation in effective velocity is smallest is structured.

14. The wireless communication system according to claim 13, wherein:
  each of the plurality of wireless communication devices further includes a communication interface configured to transmit indicator information relating to the effective velocity, and to the amount of temporal variation in the effective velocity, of the selected maximum-speed wireless communication route, and to receive indicator information transmitted from another wireless communication device; and
  the circuitry is further configured to
    use the effective velocity included in the indicator information received by the communication interface to estimate the effective velocity of a wireless communication route to the designated wireless communication device passing the other wireless communication device having transmitted the indicator information; and
    select, when a plurality of maximum-speed wireless communication routes are present, based on the calculated amount of temporal variation and the amount of temporal variation in the effective velocity included in the indicator information received by the communication interface, as a connection destination one of the designated wireless communication device and the wireless communication devices other than said wireless communication device such that a maximum-speed wireless communication route is structured.

15. A method for, in a wireless communication system including: a designated wireless relay device connected to an external network; and a plurality of wireless communication devices directly or indirectly connectable to the designated wireless relay device wirelessly, selecting a wireless communication route to be structured between the designated wireless relay device and one of the plurality of wireless communication devices, the plurality of wireless communication devices including a wireless terminal and at least one other wireless relay device different from the designated wireless relay device, the method comprising:
  a step of estimating effective velocities of communication on a plurality of wireless communication routes structurable between the designated wireless relay device and the one of the plurality of wireless communication devices; and
  a step of selecting as a connection destination one of the designated wireless relay device and the at least one other wireless relay device such that, among the plurality of wireless communication routes, a maximum-speed wireless communication route, being a wireless communication route having the maximum-speed effective velocity estimated by the step of estimating, is structured, wherein
  the plurality of wireless communication routes includes a first wireless communication route which directly connects the one of the plurality of wireless communication devices to the designated wireless relay device wirelessly, and a second wireless communication route which connects the one of the plurality of wireless communication devices to the designated wireless relay device through at least one of the at least one other wireless relay device wirelessly.

16. A system of wireless relay devices at least one of which is connected via a router to an external network and each of which is wirelessly communicable with a wireless terminal either directly or via at least one other wireless relay device, each wireless relay device comprising:
  circuitry configured to
    detect an intensity of beacon transmissions containing transmission-rate indicating information received from any other wireless relay device of the system;
    first determine, based on the received transmission-rate indicating information, a maximum rate of transmission in communications with any other wireless relay device from which a beacon transmission is received;
    estimate an effective velocity, as a proportion of that maximum rate, of communications with the other wireless relay device;
    second determine whether the received beacon transmission indicates that the other wireless relay device is connected to the external network;
    structure communication routes from the wireless terminal to the external network via the router, based on the second determining;
    compare the estimated effective velocities with each other; and
    select one of the wireless relay devices realizing the maximum effective velocity of communications with the one of the wireless relay devices being connected to the external network.

* * * * *